(12) United States Patent
Ricketts

(10) Patent No.: US 6,572,774 B2
(45) Date of Patent: Jun. 3, 2003

(54) WASTE TREATMENT METHOD AND APPARATUS WITH INTEGRAL CLARIFIER

(75) Inventor: Donald D. Ricketts, Monterey, VA (US)

(73) Assignee: Wastewater Technology, Inc., Monterey, VA (US)

(*) Notice: Subject to any disclaimer, the term of this patent is extended or adjusted under 35 U.S.C. 154(b) by 40 days.

(21) Appl. No.: 09/784,032

(22) Filed: Feb. 16, 2001

(65) Prior Publication Data

US 2002/0113010 A1 Aug. 22, 2002

(51) Int. Cl.[7] .................................................. C02F 3/08
(52) U.S. Cl. ........................ 210/619; 210/626; 210/151; 210/195.4; 210/197
(58) Field of Search ................................. 210/615, 619, 210/626, 150, 151, 195.3, 195.4, 197, 532.2

(56) References Cited

U.S. PATENT DOCUMENTS

| | | | | | |
|---|---|---|---|---|---|
| 3,339,741 | A | * | 9/1967 | Bernard et al. | 210/195.4 |
| 3,385,444 | A | * | 5/1968 | DuFournet | 210/195.4 |
| 3,415,378 | A | * | 12/1968 | Fukuda | 210/195.4 |
| 4,035,290 | A | * | 7/1977 | Torpey | 210/151 |
| 4,211,657 | A | * | 7/1980 | Etlin | 210/195.4 |
| 4,224,155 | A | * | 9/1980 | Milne | 210/195.3 |
| 4,421,648 | A | * | 12/1983 | Besik | 210/619 |
| 4,505,813 | A | * | 3/1985 | Graves | 210/532.2 |
| 5,316,668 | A | * | 5/1994 | Tang | 210/195.4 |
| 6,039,873 | A | | 3/2000 | Stahler | |

* cited by examiner

Primary Examiner—Christopher Upton
(74) Attorney, Agent, or Firm—Stevens, Davis, Miller & Mosher, L.L.P.

(57) ABSTRACT

A waste treatment method and apparatus including an aeration basin for holding waste, an aerating device for aerating the waste and an integral clarifier in which sludge particles separate out of the waste, leaving discharge water and recycled sludge. Between the clarifier and the aeration basin there is at least one opening or conduit through which either or both waste from the aeration basin may flow into the clarifier or recycled sludge from the clarifier may flow into the aeration basin. Preferably, the apparatus facilitates both activated sludge and fixed film processes in a single main tank.

21 Claims, 3 Drawing Sheets

WASTE TREATMENT METHOD AND APPARATUS WITH INTEGRAL CLARIFIER

BACKGROUND OF THE INVENTION

1. Field of the Invention

The invention relates to biological treatment of waste through activated sludge and fixed film processes.

2. Description of the Prior Art

Biological treatment of waste often employs either activated sludge or fixed film. Activated sludge is the semi-liquid biomass removed from the liquid flow of waste, particularly from the liquid flow of wastewater. Before it is fully decomposed by aerobic microbial decomposition, activated sludge is put into aeration tanks to facilitate and further undergo aerobic microbial decomposition. Fixed film processes use biological aerators that rotate around a central horizontal shaft, which is submerged in the wastewater. As the aerators reemerge from the surface of the wastewater, they catch air in specially profiled cells.

A typical activated sludge or fixed film apparatus uses an aeration tank, also referred to as an aeration basin or biotank, and a separate settling tank or gravity clarifier, also referred to as a settling tank or gravity separator. See, for example, U.S. Pat. No. 6,039,873, to Stahler, the entire disclosure of which is herein incorporated by reference. The purpose of the clarifier is to remove the suspended solid particles in the wastewater. The solid particles range in size from microscopically fine to rather coarse, and consist primarily of undissolved or unoxidized material, spent bacteria and other microorganisms. The clarifier can be one of a number of types, including circular, hopper bottom or rectangular. In the prior art, however, they are all separate from the aeration tank.

Once separated from the supernatant liquor, the solid particles settle to the bottom of the clarifier to form a sludge. The sludge is then returned to the aeration basin by a return sludge pump. The sludge, which contains viable bacteria and other microorganisms, reacts with the wastewater in the aeration basin to further the activated sludge process. The rate of return can vary widely in proportion to the rate of influent flow. Typical rates are 25–100 percent of the influent flow.

The prior art systems work reasonably well, but most use either a fixed film process or an activated sludge process, thereby foregoing the advantages of the other process. Specifically, the fixed film process is simpler, and provides more stable treatment with lower power costs, while activated sludge is more flexible and meets higher quality effluent standards.

Furthermore, in the prior art the separation of the clarifier from the aeration tank creates a need for return pumps and piping that considerably increases construction cost and complicates operation. Finally, the prior art mounting of the rotating contact aerators in the aeration tank also increases construction cost and operation complexity. It is well known to construct concrete or steel supports or haunches to mount the bearings of contact aerators. The bearings are then bolted to the steel brackets or concrete haunches. When a rotating contact aerator must be removed from the aeration tank, however, it must first be drained so that the mounting bolts are accessible. Accordingly, flow through the plant must be stopped and the mixed liquor inside the aeration tank removed by pumping or hauling.

SUMMARY OF THE INVENTION

The present invention comprises a waste treatment apparatus and method. The apparatus includes an aeration basin (e.g., an aeration tank or bio-tank), an aerating device (e.g., a fixed film aerator or rotating biological contact aerator), a clarifier and, optionally, a mounting frame. The aeration basin substantially contains sludge and waste, the mixture of which is referred to as mixed liquor. The aeration basin has an inlet for receiving waste, such as an influent conduit or valve. The aerating device aerates the mixed liquor in the aeration basin.

In the clarifier, solid particles separate from the mixed liquor, resulting in recycled sludge and discharge water. Preferably, the solid particles precipitate out, leaving supernatant discharge water. The clarifier has an outlet, such as an effluent conduit or overflow weir, for discharging the supernatant. Between the clarifier and the aeration basin there is at least one opening or conduit through which either mixed liquor from the aeration basin may flow into the clarifier or sludge from the clarifier may flow into the aeration basin. Alternatively, both types of flow occur, sequentially or simultaneously. In at least one case, the flow proceeds substantially without the assistance of a pump. Most preferably, both types of flow occur through a single opening or conduit and both types of flow proceed substantially without need of a pump.

As described above, the clarifier is structurally or functionally integral with the aeration basin. The clarifier is structurally integral, for example, when the clarifier and aeration basin are partitioned from each other along their mutual boundary by a partition that creates an incomplete seal between them. The seal is incomplete where, inter alia, the partition has an opening or conduit near the floor of the aeration basin. Preferably, this opening or conduit is just large enough to allow the flow of waste into the clarifier and the flow of sludge into the aeration basin to proceed at rates sufficient to achieve the optimum amount of sludge required in the aeration basin. As such, the aeration basin and clarifier may reside in a single main tank separated only by the partition, or may be contained within a single main tank body.

In more preferred embodiments, the apparatus uses a hybrid of activated sludge and fixed film processes to treat the mixed liquor. The combination of the two technologies takes advantage of the best aspects of both types of treatment. In such cases, the aerating device preferably comprises a rotating fixed film aerator with biological contact aerator cell segments. A most preferred type of fixed film aerator, known as a "Bio-Wheel™" (a trademark of Wastewater Technology Inc., Monterey, Va.), lacks external aerators, such as diffusers, that are present on typical fixed film aerators. Rather, the aerators are part and parcel of the Bio-Wheel™. The Bio-Wheel™ also includes a paddle to agitate the mixed liquor, most preferably a single paddle in a fixed position. The paddle helps force lighter aerated mixed liquor down near the opening or conduit and some of that aerated mixed liquor travels through the opening into the clarifier. The portion of the partition near the opening may be inclined, forming a partition lip, preferably inclined toward the clarifier. The waste treatment apparatus may have one clarifier or a plurality of clarifiers.

In a still more preferred embodiment, the waste treatment apparatus includes a mounting frame for mounting the aerating device within the aeration basin, wherein the mounting frame is fastened to the aeration basin at a point at or above the surface level of the mixed liquor regularly contained within the aeration basin. This is facilitated where the mounting frame has a lip that engages the top of a wall of the aeration basin. In a most preferred embodiment, the mounting frame includes a lifting means, preferably near the top, whereby the aerating device may be lifted out of the aeration basin by lifting the mounting frame. Ideally, the mounting frame is in the shape of an inverted "A" and a point of attachment for the aerating device is located near the apex of the mounting frame. Most preferably, the aerating device has an axle and wheel bearings that attach to the frame at the frame's point of attachment.

The method of the invention includes the steps of directing waste into an aeration basin through an inlet; substantially containing sludge and the waste in the aeration basin, in which the sludge and waste form a mixed liquor; aerating the mixed liquor in the aeration basin with an aeration device; directing aerated mixed liquor in the aeration basin into a clarifier, removing solid particles from the mixed liquor in the clarifier to form recycled sludge and discharge water; discharging the discharge water through an outlet; and directing the recycled sludge into the aeration basin. Further, either or both the aerated mixed liquor in the aeration basin and the recycled sludge in the clarifier are directed to the clarifier and aeration basin, respectively, through an opening between the clarifier and the aeration basin. Directing the aerated mixed liquor and/or the recycled sludge involves either directing the mixed liquor from the aeration basin into the clarifier substantially without the means of a pump, directing of the recycled sludge from the clarifier into the aeration basin substantially without the means of a pump, and/or a simultaneous combination thereof.

In preferred embodiments of the method, the clarifier is structurally integral to the aeration basin in that the clarifier and aeration basin are contained within a single main tank. Also, preferably the clarifier and aeration basin are separated from each other along their mutual boundary by a partition in which the aforementioned opening is formed. More preferably, the method substantially facilitates both fixed film and activated sludge processes in the main tank. Still more preferably, the method includes the steps of mounting the aerating device on a mounting frame; placing the mounting frame and mounted aerating device into the aeration basin; and fastening the mounting frame to the aeration basin at a point at or above the surface level of the mixed liquor regularly contained within the aeration basin. This allows the aerating device to be lifted out of the aeration basin by lifting the mounting frame out of the aeration basin. The method also includes all of the preferred embodiments that were described above in reference to the apparatus.

The method and apparatus of the invention will be better understood by reference to the appended drawings and the following description.

DETAILED DESCRIPTION OF THE PREFERRED EMBODIMENTS

Figure 1:
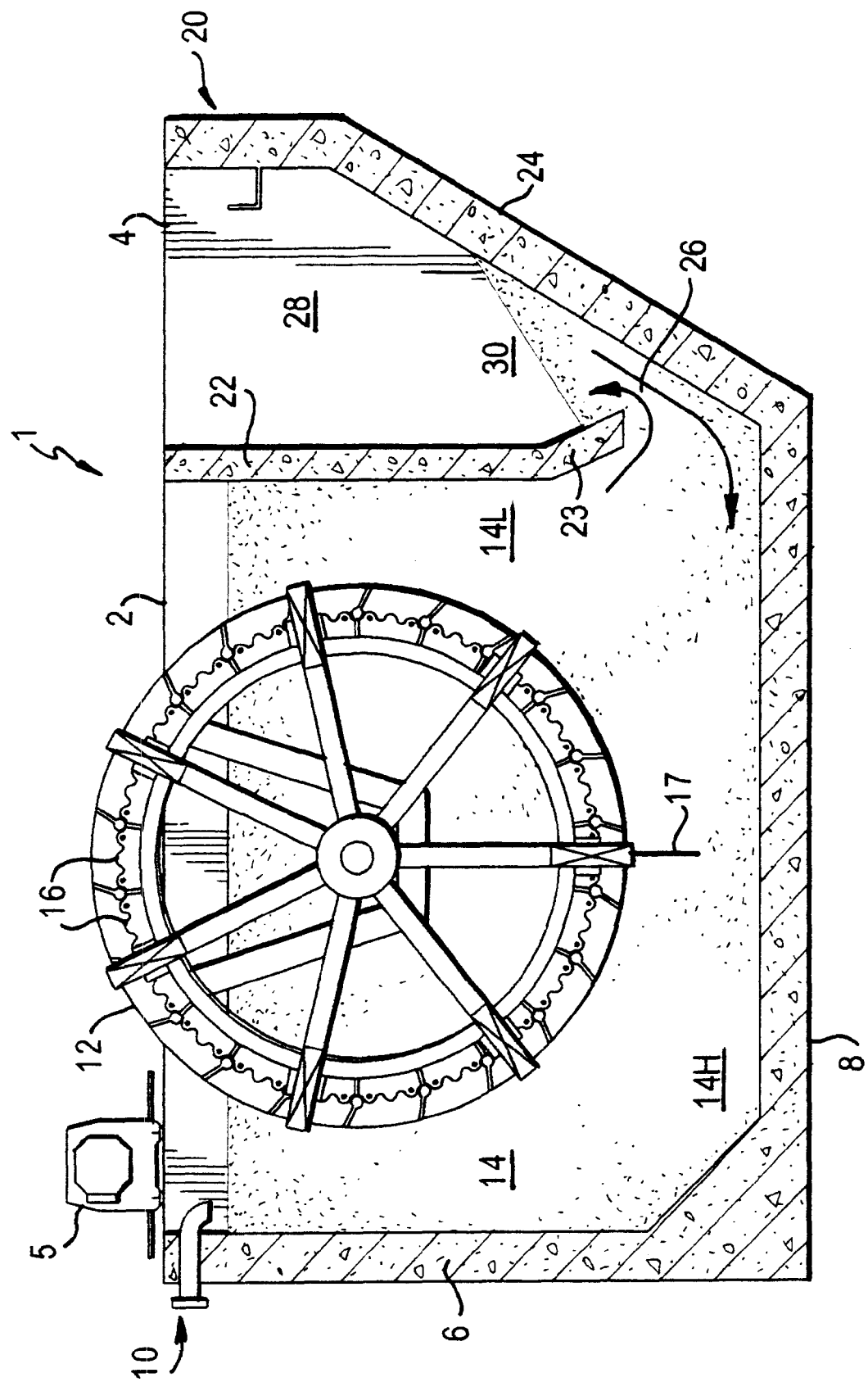
FIG. 1 is a cross-sectional side view of an embodiment of the apparatus with an integral clarifier at one end.

FIG. 1 depicts a cross-sectional side view of waste treatment apparatus 1 (hereinafter "apparatus 1") including aeration basin 2 with integral clarifier 4 at one end. Aeration basin 2 comprises rear wall 6, floor 8, influent valve 10 and rotating aerator 12. Motor 5 sits atop aeration basin 2. Aeration basin 2 is substantially filled with mixed liquor 14, which primarily comprises a mixture of influent, sludge and air. Clarifier 4 comprises effluent outlet 20, partition 22, partition lip 23, back wall 24 and narrow opening 26. Clarifier 4 contains supernatant 28 and precipitate sludge 30.

Motor 5 drives rotating aerator 12, causing it to rotate. Motor 5 is preferably a variable speed electric gear motor, which turns rotating aerator 12 with a chain drive. As the air cells 16 on rotating aerator 12 rotate out of mixed liquor 14, they fill with air and, upon reentering, disperse that air evenly throughout their rotation through mixed liquor 14, preferably depleting their supply just as they re-approach the surface of mixed liquor 14 on their rearward upstroke. The speed of rotation can be controlled by varying the speed of motor 5. Paddle 17, which extends almost to floor 8 of aeration basin 2 when at the six o'clock position, agitates heavier nonaerated mixed liquor 14H and sludge that would otherwise collect on floor 8 of aeration basin 2. On its forward downstroke, paddle 17 forces lighter aerated mixed liquor 14L down toward floor 8 and partition 22. Some of mixed liquor 14L enters clarifier 4 through the top portion of narrow opening 26. The solid particles in that mixed liquor 14L then settle out to form precipitated sludge 30. The remaining supernatant water 28 exits through effluent outlet 20. Precipitated sludge 30 slides down back wall 24 and into aeration basin 2 through the bottom of narrowing opening 26. Precipitated sludge 30 is eventually moved upwards toward the surface of mixed liquor 14 by force of the rearward upstroke of paddle 17.

Figure 2:
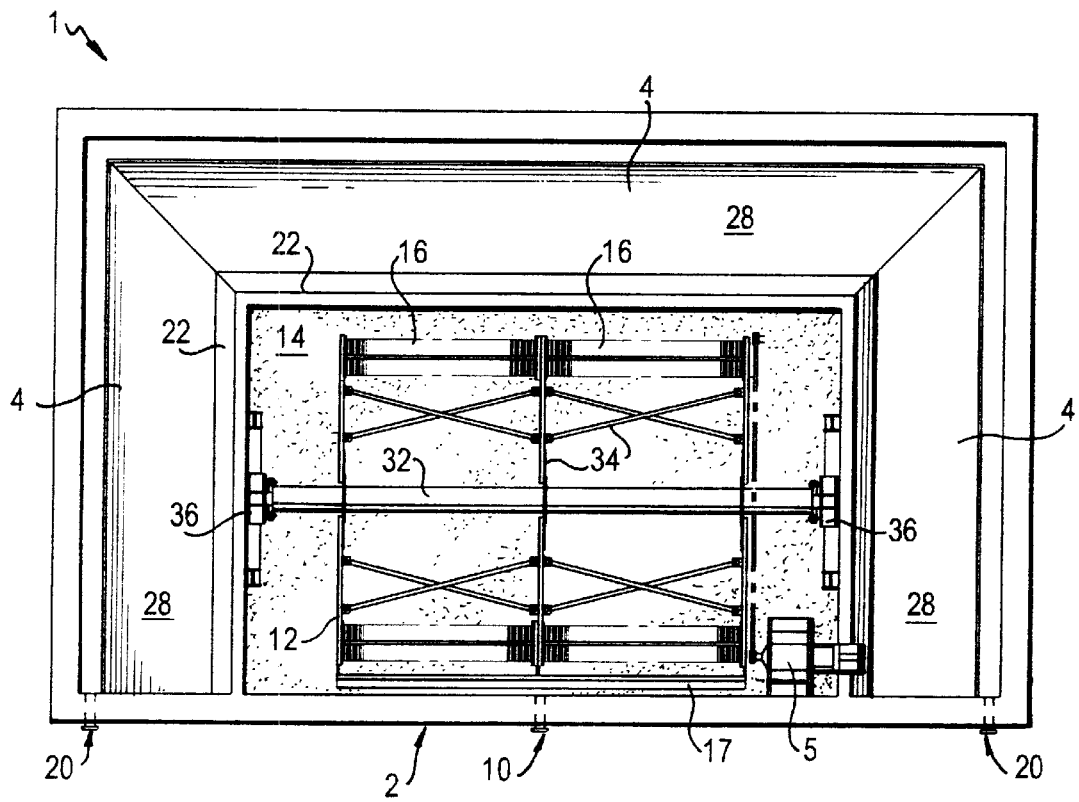
FIG. 2 is a top view of an embodiment of the apparatus with an integral clarifier at one end and at both sides.

FIG. 2 is a top view of an embodiment of the apparatus with an integral clarifier 4 at one end and at both sides. In FIG. 2, partition 22 extends around three sides of aeration basin 2. FIG. 2 additionally shows axle 32, spokes 34, brackets 35 and mounting frame 36 attached to rotating aerator 12.

Figure 3:
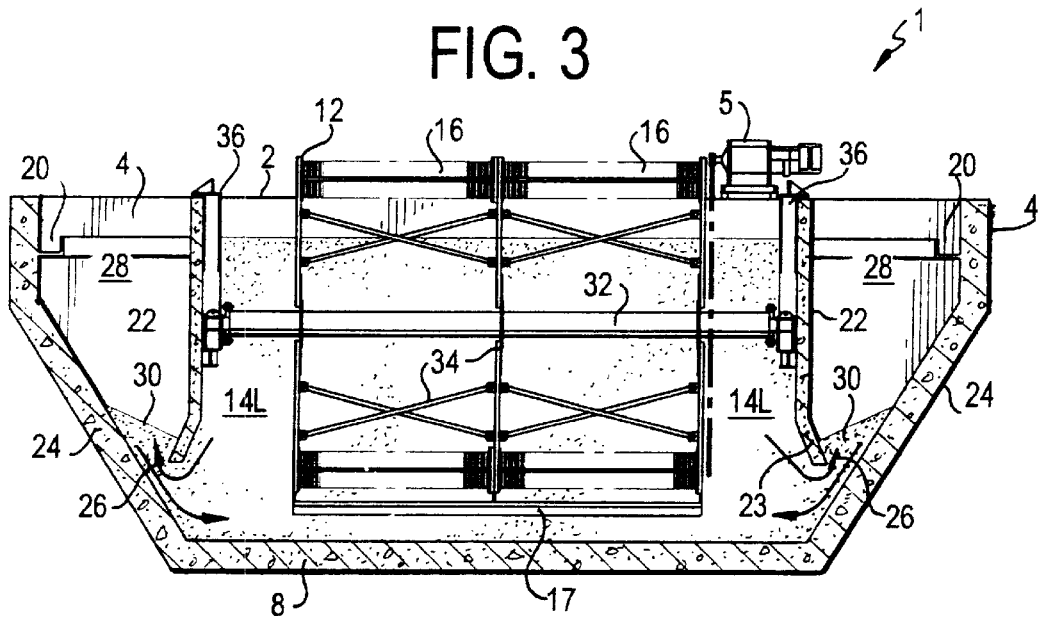
FIG. 3 is a cross-sectional end on view of an embodiment of the apparatus with an integral clarifier at both sides.

FIG. 3 is a cross-sectional end on view of an embodiment of the apparatus with an integral clarifier 4 at both sides. FIG. 3 shows that each clarifier 4, or each side of one continuous clarifier 4, may have a narrow opening 26.

Figure 4:
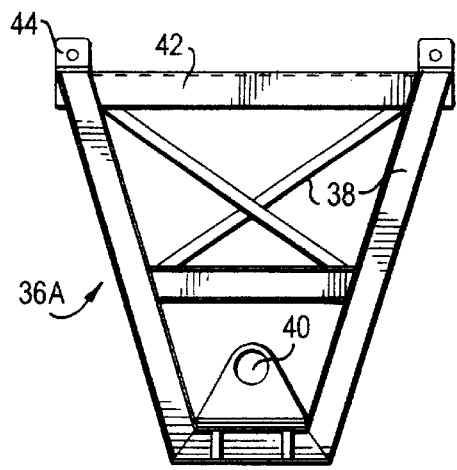
FIG. 4 is a side view of a mounting frame of the present invention.

FIG. 4 is a side view of a mounting frame 36A of the present invention. Mounting frame 36A comprises girders 38 attached so as to form an inverted "A." The bearing point 40 for the bearing of rotating aerator 12 (not shown) is located near the lower apex of the inverted "A." The upper edge of the inverted "A" contains a lip 42 that overlaps the top a wall of aeration basin 2 (not shown). Fastenings (not shown) maintain mounting frame 36A in position during revolution of rotating aerator 12. Preferably, mounting frame 36A is made of steel and there are two for each rotating aerator 12 (not shown), one on each side. Each mounting frame 36A has one or more lifting points 44 to facilitate the attachment of a sling, hoist or other means of lifting.

Figure 5:
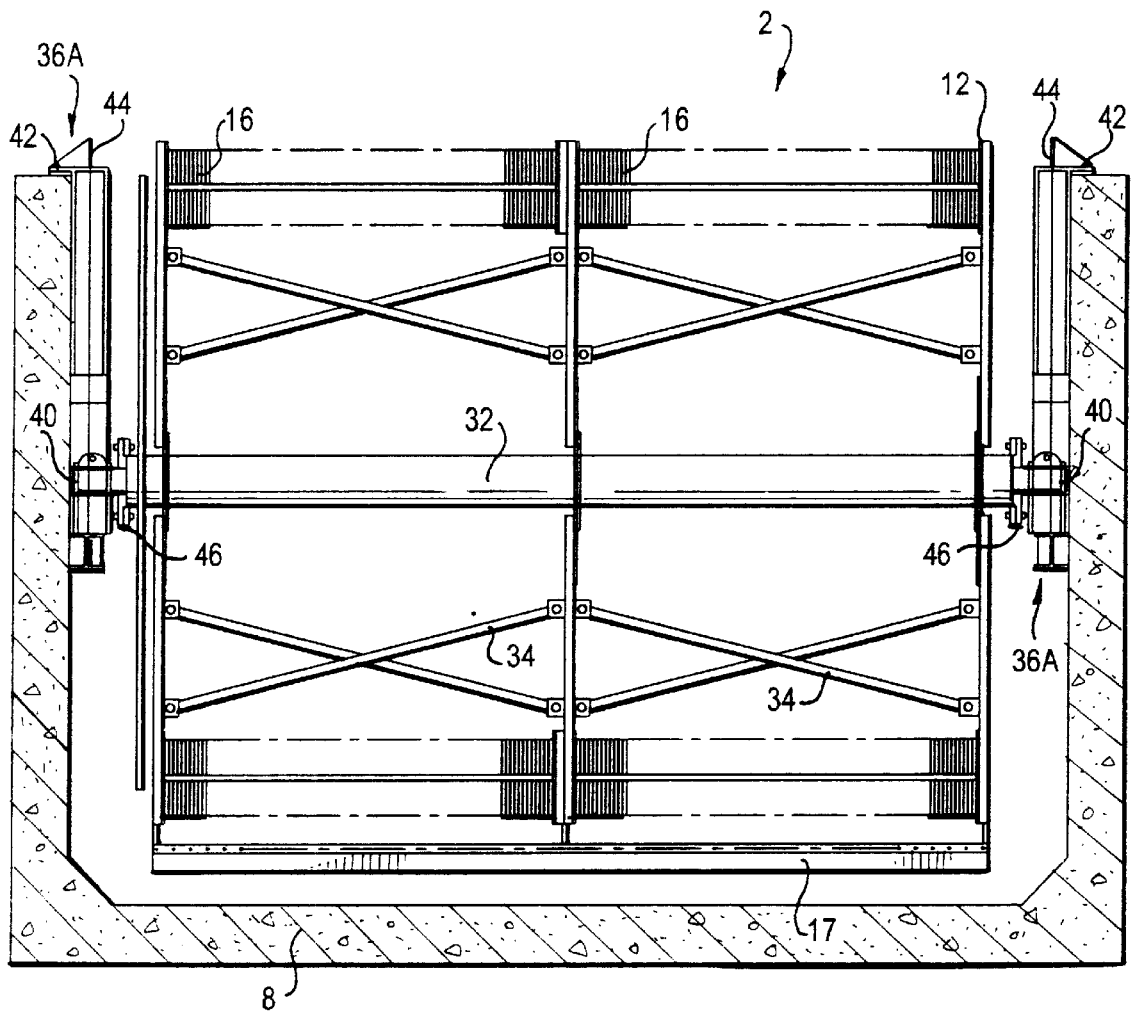
FIG. 5 is a cross-sectional side view of a rotating aerator mounted on a mounting frame inside an embodiment of the apparatus.

FIG. 5 is a cross-sectional side view of rotating aerator 12 mounted on mounting frames 36A inside an embodiment of aeration basin 2. FIG. 5 additionally depicts wheel bearings 46 of rotating aerator 12.

The invention preferably operates and is further described as follows. The apparatus and method can be operated as a hybrid of activated sludge and fixed film processes. Typically, 75–80 percent of the treatment takes place in the activated sludge component and 20–25 percent takes place in the fixed film component.

Preferably, the integral clarifier is substantially partitioned from the aeration basin by a partition. The partition, however, stops short of the floor, leaving a narrow opening between the clarifier and the aeration basin. The back wall of the clarifier, that is, the wall opposite the aeration basin, slopes so that the solids and sludge in the clarifier slide toward the bottom of the narrowing opening and into the aeration basin. At the same time, some lighter aerated mixed liquor in the aeration basin enters the clarifier through the top of the narrow opening.

In other words, the narrow opening preferably acts as a two-way door, with sludge going one way through the bottom of the opening and aerated liquor going the other way through the top of the opening. Agitation by the paddle on the rotating aerator forces lighter aerated liquor down near the bottom of the aeration basin. Some of that aerated liquor enters the opening between the aeration basin and clarifier, passing over incoming sludge as it does so. In the clarifier, where there is much less agitation, the solids in the aerated liquor settle to the bottom of the clarifier to form sludge that slides down to the narrow opening and back into the aeration basin. The supernatant liquor or discharge water exits through an outlet or effluent weir, preferably located near the top of the clarifier away from the sludge, and is often further treated with chlorination or oxidation.

Multiple integral clarifiers and hence partitions may be on either or both sides or ends of the aeration basin. Alternatively, one clarifier and partition may extend continuously as one piece around all or part of the aeration basin. In preferred embodiments, the opening is narrow enough to prevent excessive migration of the mixed liquor from the aeration basin into the clarifier. In more preferred embodiments, the partition lip inclines toward the clarifier, most preferably at an angle of about 35 degrees. The partition lip helps prevent the paths of the entering mixed liquor and the exiting sludge from conflicting and facilitates a laminar flow of the sludge. In addition, the partition lip tends to stiffen the partition, which is preferably not supported along its bottom edge. It is also desirable that the back wall of the clarifier slope at an angle steep enough to direct the sludge through the opening, such as an angle of about 50–65 degrees, most preferably 60 degrees. In some plants, an oxygen probe in the aeration basin may regulate the speed of the rotating aerator to maintain a constant oxygen level.

In still more preferred embodiments, the rotating aerator is supported by a mounting frame fastened to the top of the aeration basin. In the prior art, about 70 percent of the rotating aerator, and 100 percent of the mountings and bearings for the central axle, are submersed under the surface of the mixed liquor. In the present invention, when mounted on the mounting frame in the aeration basin, the rotating aerator and the mountings and bearings for the central axle are still submersed in the mixed liquor, but the frame itself is fastened to the top of the aeration basin. As such, the frame and attached rotating aerator may be removed easily from the aeration basin by a crane or hoist, without removing the mixed liquor from the aeration basin or stopping flow through the plant. Thus, it is possible for a plant with more than one biotank to remain in service. When repairs or inspection is completed, the rotating aerator may be reinstalled and reattached to the top of the aeration basin.

In even more preferred embodiments, the frame is shaped as an inverted "A" with the bearing of the wheel located at the lower apex of the "A." The upper edge of the inverted "A" contains a lip that overlaps the top of the aeration basin. Sufficient fastenings, most preferably bolts, must maintain the "A-Frame" in position during revolution of the rotating aerator.

Preferably, these frames are made of steel and there are two for each wheel. Preferably, each frame has one or more lifting points to facilitate the attachment of a sling, hoist or other means of lifting the frame from its position on the upper edge of the aeration basin. Each pair of frames should be lifted simultaneously to maintain a horizontal position of the rotating aerator during its removal.

The rotating aerator may even be constructed or erected inside the aeration basin by using the A-frames to support the bearings, or the wheel may be preassembled on the job site or elsewhere. If the rotating aerator is constructed outside of the aeration basin, the A frames can be attached and the rotating aerator lifted into place in the aeration basin.

Applications of the invention typically include: treatment of domestic and municipal wastewater from 2,000 gallons per day (GPD) to 2 million gallons per day (MPD); treatment of domestic wastewater containing industrial and manufacturing wastes; treatment and pretreatment of high strength organic industrial wastewater; treatment of land fill leachate; combination with septic tanks and lagoons for improved nitrification and biological phosphorous removal; treatment of liquid manure in hog farms, feed lots and animal processing facilities; food processing operations; aerobic sludge stabilization; and aquaculture including fish farming in closed circuit systems.

It should be understood that the foregoing summary, detailed description, examples and drawings of the invention are not intended to be limiting, but are only exemplary of the inventive features that are defined in the claims. For example, the aerating device may not be a rotating aerator-type device. Instead, an air pump may simply pump air into the aeration basin, thus causing aeration and agitation. Alternatively, a fluid pump or propeller might aerate the mixed liquor by throwing it up into the air above the aeration basin.

Regarding the integral clarifier aspect of the invention, it is possible to have openings near the middle or top of the partition as well as or instead of at its bottom. In such a case, it is likely that aerated mixed liquor would enter from all openings while sludge would only exit through the bottom opening. Another possibility is that the clarifier is not structurally integral with the aeration basin, i.e., they do not abut each other or reside in a single main tank body. Rather, they may be only functionally integral. In other words, merely creating a space between the clarifier and aeration basin so that they do not abut one another would not in itself escape the essence of the clarifier feature. For example, the clarifier would be functionally integral if a conduit(s) or pipe(s) joining the clarifier and aeration basin allowed the flow of either aerated mixed liquor or sludge, without the means of a pump. For example, if an apparatus or method were substantially the same as the preferred embodiment except that the aerated mixed liquor was pumped from the aeration basin into the clarifier, that apparatus or method would still manifest the inventive clarifier feature. Likewise, if an apparatus or method were substantially the same as the preferred embodiment except that the settled sludge was pumped from the clarifier into the aeration basin, it would manifest the inventive clarifier feature. It should also be noted that nongravity clarifiers may be used. Instead of letting the sludge gradually settle out of the mixed liquor by force of gravity, the clarifier could use a rotation means to rotate the water and separate the sludge from the discharge water by centrifugal force. In such a case, the sludge could precipitate out against the walls of the clarifier and then slide down the walls toward the opening near the bottom.

The invention is not limited to the embodiments shown since they can be modified by those skilled in the art without departing from the spirit and scope of the appended claims.

I claim:

1. A waste treatment apparatus comprising:
an aeration basin capable of receiving waste through an inlet and substantially containing sludge and said waste, wherein the sludge and waste comprise a mixed liquor in the aeration basin;
at least one aerating device for aerating the mixed liquor in the aeration basin;
said at last one aerating device comprising a fixed film aerator; said at least one aerating device being mounted to a mounting frame whereby the aerating device can be removed from the aeration basin by removing the mounting frame from the aeration basin.

2. The waste treatment apparatus of claim 1, wherein a clarifier is structurally integral to the aeration basin.

3. The waste treatment apparatus of claim 2, wherein the clarifier and aeration basin are contained within a single main tank.

4. The waste treatment apparatus of claim 3, wherein the clarifier and aeration basin are separated from each other along their mutual boundary by a partition, said opening being formed in said partition.

5. The waste treatment apparatus of claim 4, wherein the opening appears in the partition near a floor of the aeration basin, and wherein the opening is just large enough to allow the flow of the mixed liquor into the clarifier and the flow of recycled sludge into the aeration basin to proceed at rates sufficient to achieve the optimum amount of sludge required in the aeration basin.

6. The waste treatment apparatus of claim 5, wherein said at least one aerating device also comprises a rotating aerator.

7. The waste treatment apparatus of claim 6, wherein the apparatus substantially facilitates both fixed film and activated sludge processes in said main tank.

8. The waste treatment apparatus of claim 7, wherein said rotating aerator forces lighter aerated mixed liquor near said opening.

9. The waste treatment apparatus of claim 8, wherein there is only one of said openings and each of said types of flow proceeds through it.

10. The waste treatment apparatus of claim 9, wherein each of said types of flow proceeds substantially without need of a pump.

11. The waste treatment apparatus of claim 10, wherein the portion of the partition near said opening is inclined toward the clarifier.

12. The waste treatment apparatus of claim 11, wherein a plurality of clarifiers are present on sides of the aeration basin.

13. The waste treatment apparatus of claim 1, wherein said aerating device comprises at least one biological contact aerator rotatable about a horizontal axis and further comprising a mounting frame for mounting said aerating device at least partially within said aeration basin, wherein said mounting frame is fastened to the aeration basin at a point at or above the surface level of the mixed liquor regularly contained within the aeration basin.

14. The waste treatment apparatus of claim 13, wherein the mounting frame further comprises a lip that engages the top of a side of the aeration basin and a lifting means, whereby the aerating device may be lifted out of the aeration basin by lifting the mounting frame out of the aeration basin.

15. The waste treatment apparatus of claim 14, wherein the mounting frame is in the shape of an inverted "A" and a point of attachment for the aerating device is located near the apex of the "A".

16. The waste treatment apparatus of claim 1 when there is more than one aerating device.

17. A waste treatment apparatus comprising:
an aeration basin capable of receiving waste through an inlet and substantially containing sludge and said waste, wherein the sludge and waste comprise a mixed liquor in the aeration basin;
at least one aerating device for aerating the mixed liquor in the aeration basin;
said at least one aerating device comprising a fixed film aerator; said at least one aerating device being mounted to a mounting frame whereby the aerating device can be removed from the aeration basin by removing the mounting frame from the aeration basin;
a clarifier in which solid particles separate from the mixed liquor, resulting in recycled sludge and discharge water, said clarifier having an outlet for discharging the discharge water;
wherein between said clarifier and said aeration basin there is at least one opening through which there may be a flow of a type selected from the group consisting of (1) a flow of the mixed liquor from said aeration basin into said clarifier substantially without the means of a pump, (2) a flow of the recycled sludge from said clarifier into said aeration basin substantially without the means of a pump, and (3) a simultaneous combination thereof;
wherein the clarifier is structurally integral to the aeration basin in that the clarifier and aeration basin are contained within a single main tank and also in that the clarifier and aeration basin are separated from each other along their mutual boundary by a partition, said opening being formed in said partition; and
wherein the apparatus substantially facilitates both fixed film and activated sludge processes in said main tank.

18. A method for treating waste comprising:
directing waste into an aeration basin capable of receiving the waste through an inlet;
substantially containing sludge and the waste in the aeration basin, wherein the sludge and waste comprise a mixed liquor;
mounting a fixed film aerating device on a removable mounting frame;
aerating the mixed liquor in the aeration basin with said aerating device;
directing aerated mixed liquor in the aeration basin into a clarifier, said clarifier having an outlet for discharging discharge water;
removing solid particles from the mixed liquor in the clarifier to form recycled sludge and discharge water;
directing the recycled sludge into the aeration basin; and
wherein at least one of the aerated mixed liquor in the aeration basin and the recycled sludge in the clarifier are directed to the clarifier and aeration basin, respectively, through an opening between the clarifier and the aeration basin via which there is direction of a type selected from the group consisting of (1) direction of the mixed liquor from said aeration basin into said clarifier substantially without the means of a pump, (2) direction of the recycled sludge from said clarifier into said aeration basin substantially without the means of a pump, and (3) a simultaneous combination thereof.

19. The method of claim 18, wherein the clarifier is structurally integral to the aeration basin in that the clarifier and aeration basin are contained within a single main tank and also in that the clarifier and aeration basin are separated from each other along their mutual boundary by a partition, said opening being formed in the partition;

wherein the apparatus substantially facilitates both fixed film and activated sludge processes in the main tank.

20. The method of claim 19, further comprising mounting the aerating device on a mounting frame;

placing the mounting frame and mounted aerating device into the aeration basin;

fastening the mounting frame to the aeration basin at a point at or above the surface level of the mixed liquor regularly contained within the aeration basin;

whereby the aerating device may be lifted out of the aeration basin by lifting the mounting frame out of the aeration basin.

21. A waste treatment apparatus comprising:

an aeration basin capable of receiving waste through an inlet and substantially containing sludge and said waste, wherein the sludge and waste comprise a mixed liquor in the aeration basin;

at least one aerating device for aerating the mixed liquor in the aeration basin;

a mounting frame for mounting said aerating device within said aeration basin, wherein said mounting frame is fastened to the aeration basin at a point at or above the surface level of the mixed liquor regularly contained within the aeration basin;

said mounting frame further comprising a lip that engages the top side of the aeration basin and a lifting means, whereby the aerating device may be lifted out of the aeration basin by lifting the mounting frame out of the aeration basis;

wherein the mounting frame is in the shape of an inverted "A" and a point of attachment for the aerating device is located near the apex of the "A";

a clarifier in which solid particles separate from the mixed liquor, resulting in recycled slude and discharge water, said clarifier having an outlet for discharging the discharge water;

wherein between said clarifier and said aeration basin there is at leat one opening through which there may be a flow of a type selected from the group consisting of (1) a flow of the mixed liquor from said aeration basin into said clarifier substantially without the means of a pump, (2) a flow of the recycled sludge from said clarifier into said aeration basin substantially without the means of a pump, and (3) a simultaneous combination thereof.

* * * * *